United States Patent
Lesoine (10) Patent No.: US 11,385,167 B2
(45) Date of Patent: Jul. 12, 2022

(54) BEAMSPLITTER BASED ELLIPSOMETER FOCUSING SYSTEM

(71) Applicant: ONTO INNOVATION INC., Wilmington, MA (US)

(72) Inventor: John F. Lesoine, San Jose, CA (US)

(73) Assignee: Onto Innovation Inc., Wilmington, MA (US)

(*) Notice: Subject to any disclaimer, the term of this patent is extended or adjusted under 35 U.S.C. 154(b) by 166 days.

(21) Appl. No.: 16/590,373

(22) Filed: Oct. 1, 2019

(65) Prior Publication Data
US 2021/0096062 A1    Apr. 1, 2021

(51) Int. Cl.
*G01N 21/21* (2006.01)
*G01J 3/02* (2006.01)
*G02B 7/28* (2021.01)

(52) U.S. Cl.
CPC .............. *G01N 21/211* (2013.01); *G01J 3/02* (2013.01); *G02B 7/28* (2013.01); *G01N 2021/213* (2013.01)

(58) Field of Classification Search
CPC ........ G01J 3/02; G01J 4/00; G01N 2021/213; G01N 21/211; G02B 27/106; G02B 27/646; G02B 7/28
USPC ......................................................... 356/369
See application file for complete search history.

(56) References Cited

U.S. PATENT DOCUMENTS

| 5,486,701 A | 1/1996 | Norton et al. |
|---|---|---|
| 5,608,526 A | 3/1997 | Piwonka-Corle et al. |
| 5,793,480 A | 8/1998 | Lacey et al. |
| 5,995,143 A | 11/1999 | Price et al. |
| 6,804,003 B1 * | 10/2004 | Wang .................. G01B 11/0641 356/369 |
| 7,724,375 B1 | 5/2010 | Novikov et al. |
| 8,559,008 B2 | 10/2013 | Blasenheim et al. |
| 9,903,806 B2 | 2/2018 | Shachaf |
| 2002/0024668 A1 | 2/2002 | Stehle et al. |
| 2003/0071190 A1 | 4/2003 | Chen et al. |
| 2005/0073684 A1 | 4/2005 | Norton |

(Continued)

FOREIGN PATENT DOCUMENTS

| CN | 107250766 A | 10/2017 |
|---|---|---|
| EP | 0031483 B1 | 7/1981 |

(Continued)

OTHER PUBLICATIONS

International Search Report and Written Opinion dated Jan. 15, 2021 from PCT/US2020/053218, filed Sep. 29, 2020.

(Continued)

*Primary Examiner* — Sunghee Y Gray
(74) *Attorney, Agent, or Firm* — Paradice and Li LLP (57) ABSTRACT

An ellipsometer includes a focusing system that uses an image of the measurement spot to determine a best focal position for the ellipsometer. The focus signal is produced by splitting off the ellipsometer measurement spot before the signal is analyzed by a polarizer thereby avoiding imagining the spot with a modulated intensity. The focus signal is imaged on a sensor array and based on the position of the spot on the sensor array, the focal position of the ellipsometer may be determined. A single image may be used to determine the focal position of the ellipsometer permitting a real time focus position measurement.

23 Claims, 4 Drawing Sheets

(56) References Cited

U.S. PATENT DOCUMENTS

| | | |
|---|---|---|
| 2005/0174575 A1 | 8/2005 | Norton et al. |
| 2006/0017676 A1 | 1/2006 | Bowers et al. |
| 2009/0066953 A1 | 3/2009 | Horie |
| 2011/0051132 A1 | 3/2011 | Petrenko et al. |
| 2012/0257200 A1 | 10/2012 | Blasenheim et al. |
| 2014/0098369 A1* | 4/2014 | Blasenheim ............ G02B 7/28 356/369 |
| 2014/0340682 A1* | 11/2014 | Kwak ................. G01N 21/274 356/369 |
| 2015/0168290 A1* | 6/2015 | Shachaf ............... G01N 21/211 356/369 |

FOREIGN PATENT DOCUMENTS

| | | | |
|---|---|---|---|
| JP | 2009068937 A | 4/2009 | |
| JP | 2010525349 A * | 7/2010 | ............... G01J 4/04 |
| WO | 2006/091781 A1 | 8/2006 | |
| WO | 2007148918 A1 | 12/2007 | |
| WO | 2012/138541 A1 | 10/2012 | |

OTHER PUBLICATIONS

Cao et al. (2007). "System error removal and structure optimization based on Fizeau interferometer," Optik vol. 118 (10):495-501.

Ma et al. (May 11, 2009). "Error analysis of CCD-based point source centroid computation under the background light," Optics Express vol. 17(10):8525-8541.

Invitation to Pay Additional Fees and Communication Relating to the Results of the Partial International Search dated Jun. 27, 2012 for PCT Application PCT/US2012/031222 filed on Mar. 29, 2012, 9 pages.

International Search Report and Written Opinion dated Sep. 26, 2012 for PCT Application PCT/US2012/031222 filed on Mar. 29, 2012, 17 pages.

Invitation to Pay Additional Fees dated Feb. 25, 2015 for International Application No. PCT/US2014/066707 filed on Nov. 20, 2014 by Nanometrics Incorporated, 5 pages.

International Search Report and Written Opinion dated Jun. 10, 2015 for International Application No. PCT/US2014/066707 filed on Nov. 20, 2014 by Nanometrics Incorporated, 17 pages.

* cited by examiner

BEAMSPLITTER BASED ELLIPSOMETER FOCUSING SYSTEM

BACKGROUND

Figure 1:
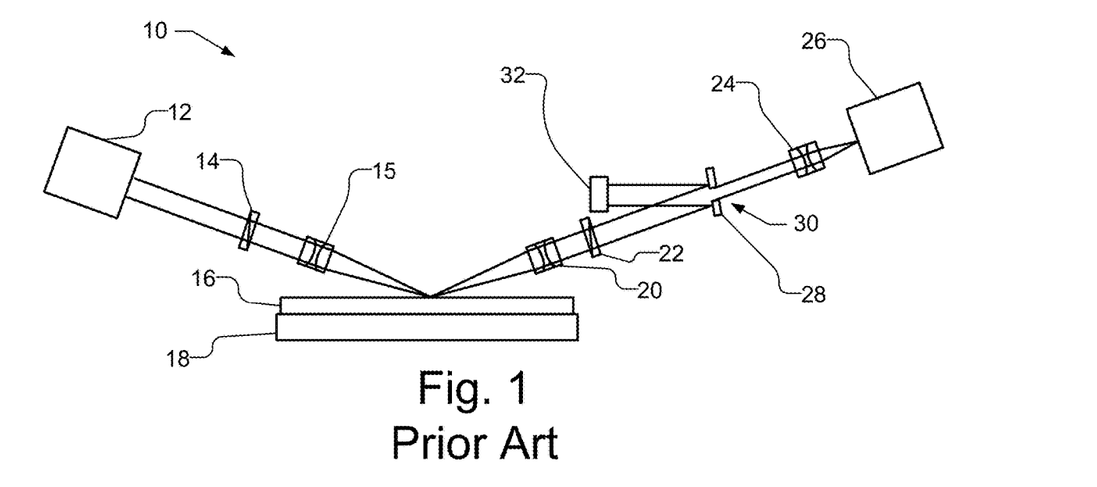
FIG. 1 illustrates an ellipsometer with a conventional focusing system.

Ellipsometers are optical metrology devices that detect changes in the polarization state of light reflected from a surface of a sample in order to measure characteristics of the sample. By way of example, FIG. 1 illustrates a conventional spectroscopic ellipsometer 10 that includes a broad band light source 12, a polarizer 14 and lens 15 to focus the illuminating light on the surface of a sample 16 that is positioned on a stage 18. The ellipsometer 10 further includes an analyzer 22 after passing through lens 20. After passing through analyzer 22, the reflected light is focused by lens system 24 on a detector 26.

The ellipsometer 10 must be properly focused on the sample. Some systems use independent focusing systems, i.e., systems that attached to the ellipsometer, but that use an independent light path to determine the position of the focusing system, and thus, the ellipsometer, with respect to the sample. Such focusing systems, however, require very precise alignment, which is expensive and difficult. FIG. 1 illustrates example of an integrated focusing system that includes a mirror 28 with an aperture 30. The mirror 28 reflects the outside rays of the reflected beam to a focus detector 32, while the inner rays of the reflected beam are transmitted through the aperture 30 and received by the ellipsometer detector 26. Typically, the focus detector 32 is a position sensitive device (PSD) or a "quad cell", neither of which image the detected light but, in principle, sums all of the light that is received. Accordingly, such devices are susceptible to inaccuracies due to stray light. Other systems, such as that described in U.S. Pat. No. 5,608,526, use a camera as the focus detector 32. Nevertheless, such a system still suffers from imprecision due to systematic errors caused by the mirror 28, because only the outer part of the beam is sampled by detector 32. Moreover, a focus system, such as that described in U.S. Pat. No. 5,608,526, lack the precision required to produce a small illuminating spot size on the sample.

Accordingly, an improved focusing system for ellipsometers is desired.

SUMMARY

An ellipsometer includes a focusing system that uses an image of the measurement spot to determine a best focal position for the ellipsometer. The focus signal is produced by splitting off the reflected measurement signal before the measurement signal is analyzed by a polarizer thereby avoiding a modulated intensity in the imaged measurement spot. Additionally, splitting off the reflected measurement signal before the analyzer avoids relative movement of the imaged measurement spot from different samples that is caused by differences in reflected elliptical polarizations across the spread of incident angles. The focus signal is imaged on a sensor array and based on the position of the spot on the sensor array, the focal position of the ellipsometer may be determined. A single image may be used to determine the focal position of the ellipsometer permitting a real time focus position measurement.

In one implementations, an ellipsometer includes a source that emits light along a path; a polarizer that polarizes the light to produce a sample beam that interacts with a sample and is reflected to produce a reflected beam; a compensator disposed in the path of the sample beam or the reflected beam, the compensator induces phase retardations of a polarization state of the light, wherein at least one of the polarizer and the compensator rotates about an axis parallel to a propagation direction of the light; a beamsplitter positioned in the path of the reflected beam after the compensator, the beam splitter positioned to receive the reflected beam and to direct a first portion of the reflected beam to a focusing system and to direct a second portion of the reflected beam to an analyzer, wherein the first portion of the reflected beam and the second portion of the reflected beam both include an entire cross-section of the reflected beam; the focusing system positioned to receive the first portion of the reflected beam from the beamsplitter, the focusing system comprising: a lens system that receives the first portion of the reflected beam, the lens system magnifies any deviation from a best focus position of the ellipsometer; and a first detector positioned to receive the first portion of the reflected beam from the lens system, wherein the first detector comprises a two-dimensional sensor and the lens system in the focusing system produce a spot on the two-dimensional sensor and the two-dimensional sensor produces an image of the spot; the analyzer positioned to receive the second portion of the reflected beam from the beamsplitter; a second detector positioned to receive the reflected beam from the analyzer; and a processor that receives the image and is configured to find a location of the spot on the two-dimensional sensor in the image to determine the deviation from the best focus position of the ellipsometer.

In one implementations, a method of focusing an ellipsometer includes generating light along a path; polarizing the light to produce a sample beam that interacts with a sample and is reflected to produce a reflected beam; inducing phase retardations of a polarization state of the light in the sample beam or the reflected beam; rotating at least one of the polarization or the phase retardations of the polarization state; splitting the reflected beam and directing a first portion of the reflected beam along a first path and directing a second portion of the reflected beam along a second path, wherein the first portion of the reflected beam and the second portion of the reflected beam both include an entire cross-section of the reflected beam; focusing the first portion of the reflected beam into a spot on a two-dimensional sensor, wherein any deviation from a best focus position of the ellipsometer is magnified; producing an image of the spot; determining a location of the spot on the two-dimensional sensor in the image; determining the deviation from the best focus position using the location of the spot on the two-dimensional sensor; adjusting a focal position of the ellipsometer based on the deviation from the best focus position; analyzing the polarization state of the second portion of the reflected beam; and detecting the analyzed second portion of the reflected beam.

In one implementations, an ellipsometer includes emits light along a path; a polarizer that polarizes the light to produce a sample beam that interacts with a sample and is reflected to produce a reflected beam; a compensator disposed in the path of the sample beam or the reflected beam, the compensator induces phase retardations of a polarization state of the light; an analyzer positioned in the path of the reflected beam after the compensator, wherein at least one of the polarizer, the compensator, and the analyzerrotates about an axis parallel to a propagation direction of the light; a focusing system positioned in the path of the reflected beam after the compensator and before the analyzer, the focusing system comprising: a beamsplitter positioned to receive the reflected beam and to direct a first portion of the reflected beam to a lens system and to direct a second portion of the reflected beam to the analyzer, wherein the first portion of the reflected beam and the second portion of the reflected beam both include an entire cross-section of the reflected beam; the lens system positioned to receive the first portion of the reflected beam and to direct the first porition of the reflected beam to a first detector, the lens system magnifies any deviation from a best focus position of the ellipsometer; and the first detector positioned to receive the first portion of the reflected beam from the lens system, wherein the first detector comprises a two-dimensional sensor and the lens system in the focusing system produce a spot on the two-dimensional sensor and the two-dimensional sensor produces an image of the spot; a second detector positioned to receive the reflected beam from the analyzer; and a processor that receives the image and is configured to find a location of the spot on the two-dimensional sensor in the image to determine the deviation from the best focus position of the ellipsometer.

DETAILED DESCRIPTION

A real time focus system for an ellipsometer may use an image of the ellipsometer measurement spot to determine a best focal position for the ellipsometer. The focus signal is produced by splitting off the reflected measurement signal before the measurement signal is analyzed by a polarizer thereby avoiding a modulated intensity in the imaged measurement spot. Additionally, splitting off the reflected measurement signal before the analyzer avoids relative movement of the imaged measurement spot from different samples that is caused by differences in reflected elliptical polarizations across the spread of incident angles. Accordingly, a single image may be used to determine the focal position of the ellipsometer, permitting a real time focus position adjustment.

Figure 2:
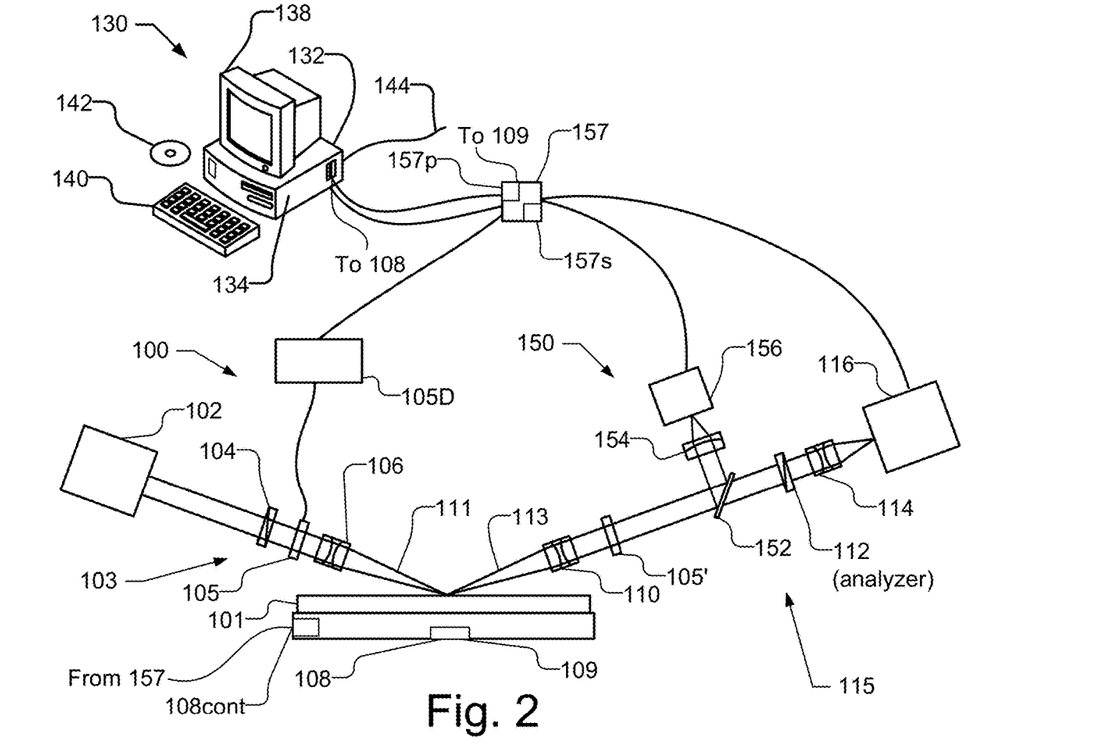
FIG. 2 illustrates an ellipsometer 100 with a high precision focusing system in accordance with an embodiment of the present invention.

FIG. 2 illustrates an ellipsometer 100 configured with a real-time high precision focusing system 150. As illustrated, ellipsometer 100 includes a light source 102 and a polarization state generator 103 and a polarization state analyzer 115. Ellipsometer 100 may be monochromatic or spectroscopic, and thus, the light source 102 may be a narrow band or broad band light source. The polarization state generator 103 includes a polarizer 104 and may include a rotating compensator 105. In some implementations, the compensator 105 may be located after the sample, as illustrated by compensator 105' shown with dotted lines. The polarization state analyzer 115 includes another polarizer 112, commonly referred to as analyzer 112. If desired, compensator 105 may be stationary and one or both of polarizer 104 and analyzer 112 may rotate, or alternatively, compensator 105 as well as polarizer 104 and analyzer 112 may rotate. A lens system 106 focuses the illuminating light 111 on the surface of a sample 101 that is positioned on a stage 108. The incident illuminating light 111 has a known polarization state due to the polarization state generator 103. The sample 101 will alter the polarization state of the light and the resulting light reflected by the sample 101 is analyzed by the polarization state analyzer 115, e.g., by passing the reflected light 113 through the analyzer 112 (and compensator 105' if located after the sample 101), after the reflected light is received by another lens system 110. After passing through the analyzer 112, the reflected light 113 is focused by a lens system 114 on a detector 116. The detector 116 detects the intensity of the reflected light 113, which may be used, along with the known positions of the polarizer 104, analyzer 112, and compensator 105 to determine ellipsometric parameters $\psi$ and $\Delta$ from which various parameters of the sample 101 may be determined, which is well known in the art.

In order to properly measure the sample 101, the ellipsometer 100 is positioned at a best focal position with respect to the sample 101. The ellipsometer 100, thus, includes an integrated auto focusing system 150 that images the same light rays that are used by the ellipsometer 100 and additionally magnifies the deviation from a best focus position. Focusing system 150 includes a beam splitter 152 that directs a portion of the reflected light 113 to a lens system 154 that focuses the light onto a detector 156.

Figure 3:
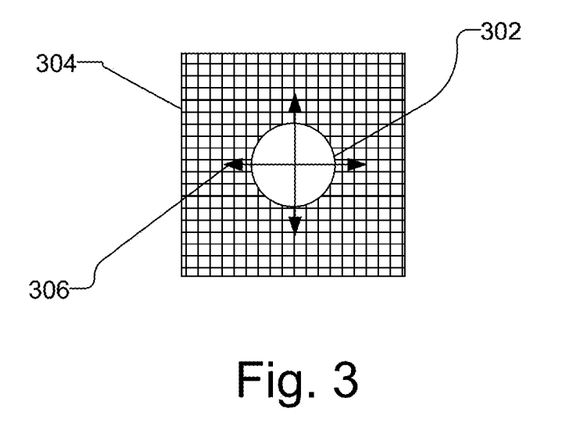
FIG. 3 illustrates a two-dimensional sensor of a camera in the focusing system with a significantly smaller light spot thereon.

As illustrated in FIG. 3, the lens system 154 focus the light into a spot 302 that is significantly smaller than the two-dimensional sensor 304 for the detector 156. The sensor 304 may be, e.g., a two dimensional sensor array such as a CCD. The spot 302 may be 1%-50%, e.g., 10% or less, of the size of the sensor 304, which increases the useful auto-focus range. The lenses of lens system 154 are arranged to magnify the deviation from the best focus position thereby providing greater measurement precision. For example, as illustrated by arrow 306 in FIG. 3, the movement of the location of the spot 302 on the sensor 304 provides a magnified indication of the deviation from the best focus position. The size of the spot on the sensor 304 may change slightly as the sample 101 is scanned through the focal range, however, this is a relatively small effect to which the spot location calculation may be configured to be insensitive. The magnification produced by lens system 154 with respect to the deviation from the best focus position may be 3× to 5× or greater, such as 10×. However, reduction of spot size decreases the focus precision and, thus, a trade-off between auto focus range and precision is made, as smaller spot makes the spot location calculation less precise but provides a higher spot intensity. Accordingly, if desired, a large spot, e.g., the size of the sensor 304 may be produced, which may be used to provide a more accurate spot location calculation.

As illustrated in FIG. 2, the beam splitter 152 of the focusing system 150 reflects a portion of the reflected light 113, e.g., 4% to 10% of the total light intensity, to the focusing system 150, and transmits the remaining portion of the reflected light 113, e.g., 90% or more of the total light intensity, to the ellipsometer detector 116. In the configuration illustrated in FIG. 2, the reflected portion is provided to the focusing system 150, but if desired, the transmitted portion of the reflected light 113 may be provided to the focusing system 150, where 4% to 10% of the reflected light intensity is transmitted. The use of beam splitter 152, which is sometimes referred to as a "pick off" beam splitter, is advantageous as the entire cross section of the reflected light 113 beam is sampled by the focusing system 150, as opposed to the system shown in FIG. 1, in which only the outside rays of the reflected light are used. By sampling the entire beam of the reflected light 113, the focusing system 150 is insensitive to systematic errors caused by sampling only portions of the reflected light 113.

The beam splitter 152 may be a pellicle beam splitter, which may have a thinness, e.g., 0.002 mm, that does not significantly impact the optical path length or aberrations in a converging beam. The effect on optical path length and aberrations would be even less in a collimated beam, as illustrated in FIG. 2. The use of a pellicle beam splitter would further minimize chromatic aberrations and prevent imaging ghosts.

As illustrated in FIG. 2, the detector 156 for the focus system 150 is coupled to a computer 130, e.g., through a frame grabber board 157. The rotating optical element, e.g., the compensator 105 or polarizer 104, and the stage 108 may also be connected to the frame grabber board 157 directly or through controller/drivers, e.g., illustrated by driver 105D. If desired, the detector 116 for the ellipsometer 100 may be coupled to the same computer 130 or a different computer. The computer 130 includes a processor 132 with memory 134, as well as a user interface including e.g., a display 138 and input devices 140. The frame grabber board 157 includes a processor 157p, (which may be a field programmable gate array (FPGA)) that is configured to determine a focus error, which is used to control the focus position of the stage 108, e.g., via a stage servo controller 108cont that receives focus error data from the frame grabber board 157 and controls an actuator 109 in the stage 108 accordingly. Thus, in one embodiment, the frame grabber board 157 is processing the focus error directly from the detector 156 and providing the focus adjustment to the stage servo controller 108cont without input from the computer 130. Of course, if desired, computer 130 may be used in part or all of the processing of the focus error and instructing the stage servo controller 108 cont. It should be understood that a processor, such as processor 157p on frame grabber board 157, may include one or more separate processing units, e.g., processor 157p may include a first processor for image processing and a separate processor for focus error determination. Additionally, one or more processors may be located in other positions, besides frame grabber board 157. For example, processor 157p (or one or more of the processor units that comprise processor 157p) may be located in detector 156, or elsewhere.

If the processor 132 is, e.g., a microprocessor, that carries out instructions of a computer program, the data structures and software code for automatically implementing one or more acts described in this detailed description can be implemented by one of ordinary skill in the art in light of the present disclosure and stored, e.g., on a computer readable storage medium, such as memory 134 or disk 142, which may be any device or medium that can store code and/or data for use by a computer system. The computer readable storage medium 134/142 may be, but is not limited to, magnetic and optical storage devices such as disk drives, magnetic tape, compact discs, and DVDs (digital versatile discs or digital video discs). A communication port 144 may also be used to receive instructions that are used to program the processor 132 to perform any one or more of the functions described herein and may represent any type of communication connection, such as to the internet or any other computer network. Additionally, the functions described herein may be embodied in whole or in part within the circuitry of an application specific integrated circuit (ASIC) or a programmable logic device (PLD), and the functions may be embodied in a computer understandable descriptor language which may be used to create an ASIC or PLD that operates as herein described. For example, as discussed above, a field programmable gate array (FPGA) may be used. The FPGA may be either in the detector 156 or on a frame grabber board 157 internal or external to the computer 130. Where processor 132 is an FPGA, computer readable storage medium 134/142 may provide the programming file to embed the desired configuration in the processor 132, which may be performed one time for a non-volatile FPGA, or otherwise at power-up. By avoiding the use of the main system CPU to perform the necessary calculations for auto focusing, the CPU is not slowed down. Further, a dedicated processor increases the image processing speed. Thus, the stage servo controller 108cont may be directly coupled to the frame grabber board 157, which may provide a signal directly to the stage servo controller 108cont through a Serial Peripheral communication Interface (SPI) channel.

As is known in the art, an ellipsometer, such as ellipsometer 100, used to measure the properties and/or structures of a sample vary the polarization state of the light using the polarization state generator 103 or polarization state analyzer 115. For example, the polarization state of the light may be varied by rotating at least one of the polarizer 104 and the compensator 105 about an axis parallel to the propagation direction of the light. In an ideal case, the rotating optic (i.e., the polarizer 104 or compensator 105) rotates around an axis that is perfectly parallel to the optical axis, in which case the location of the illumination spot on the sample 101 will not move. In practice, however, the motor and bearings that rotate the rotating optic are not perfect, resulting in a wobble of the rotating optic. In addition, the input beam to the rotating optic and the output beam after the rotating optic will not be perfectly parallel. As a result of these two effects, the illumination spot on the sample 101 moves, which will cause the spot imaged on the two-dimensional sensor of the detector 156 of the focus system 150 to move as the rotating optic rotates. The movement of the illumination spot in ellipsometer 100 may be small, e.g., less than 2 µm, but, when present, may cause problems for the auto focus system 150. Accordingly, the auto focus system 150 may be configured to compensate for the movement of the illumination spot.

There are a few different ways of varying the polarization state of the light, all of which are contemplated with the present disclosure. One way to vary the polarization state is to continuously rotate the polarizer 104 about the optical axis, while the analyzer 112, which transmits only one polarization state, is fixed. In this method, there is no need for rotating compensator 105. In the simplest case, where the sample does not change the polarization of the incident light, the result is a variation in the intensity of the light after the analyzer 112. For example, the analyzer 112 could be set to transmit only horizontally polarized light and block vertically polarized light. With the polarizer 104 starting in a position in which the illuminating light 111 is horizontally polarized, the analyzer 112 would transmit 100% of the light. As the polarizer 104 rotates 90 degrees about the optical axis, the light is now vertically polarized. As a result, the analyzer 112 will block all of the light, and there will be no signal at the detector 116. As the polarizer moves another 90 degrees (180 degrees total) it is now transmitting horizontally polarized light again and the analyzer would again transmit 100% of the light. A plot of the signal intensity vs. time, thus, produces a sine wave, where the intensity of the signal varies between 0% and 100% and the frequency of the sine wave is double the frequency of the rotation of the polarizer 104. Additionally, the analyzer 112 may rotate, while the polarizer 104 is held fixed. Alternatively, a rotating compensator 105, as illustrated in FIG. 2, may be used to vary the polarization state. The rotating compensator 105 will produce the same basic sinusoidal variation of intensity vs. time. As discussed above, the rotating compensator 105 may be located on either side of the sample 101.

In use, a sample under test will change the polarization state of the incident light, which will change the intensity and phase of the resulting signal received by the detector 116. Using the change in intensity and phase, the material properties of the sample 101 may be determined, which is the essence of ellipsometry and is well known in the art. However, the continuous variation of intensity and phase due to the rotating optic may produce problems in an auto focus system for ellipsometers. For example, a variation in the intensity of the signal between 0% and 100% after the analyzer 112 due to a rotating optic results in no or little light being available to determine the focal position of the ellipsometer during portions of the signal cycle.

Accordingly, as illustrated in FIG. 2, the beam splitter 152 for the focus system 150 is in the optical path before the analyzer 112. By placing the beam splitter 152 before the analyzer 112, the intensity of the light is not modulated due to the rotation of the optics. The beam splitter 152, thus, directs a portion of the reflected light 113 to the detector 156 before the reflected light is modulated by the analyzer 112. Accordingly, the reflected light 113 imaged onto a focal plane array, i.e., detector 156, of the focus system 150 does not have a modulated intensity. The rotation of the optic, e.g., polarizer 104 or compensator 105, however, may still produce a wobble in the spot imaged on the detector 156 of the focus system 150 as the rotating optic rotates. If desired, the analyzer 112 may rotate and the polarizer 104 and compensator 105 held stationary, which will avoid a wobble in the spot imaged by the detector 156 produced by a rotating optic. Further, if desired, the beam splitter 152 may be positioned in the beam path before the compensator 105', and one or both of the analyzer 112 and the compensator 105' may rotate while the polarizer 104 held stationary, which will again avoid a wobble in the spot imaged by the detector 156 produced by a rotating optic(s).

Figure 4:
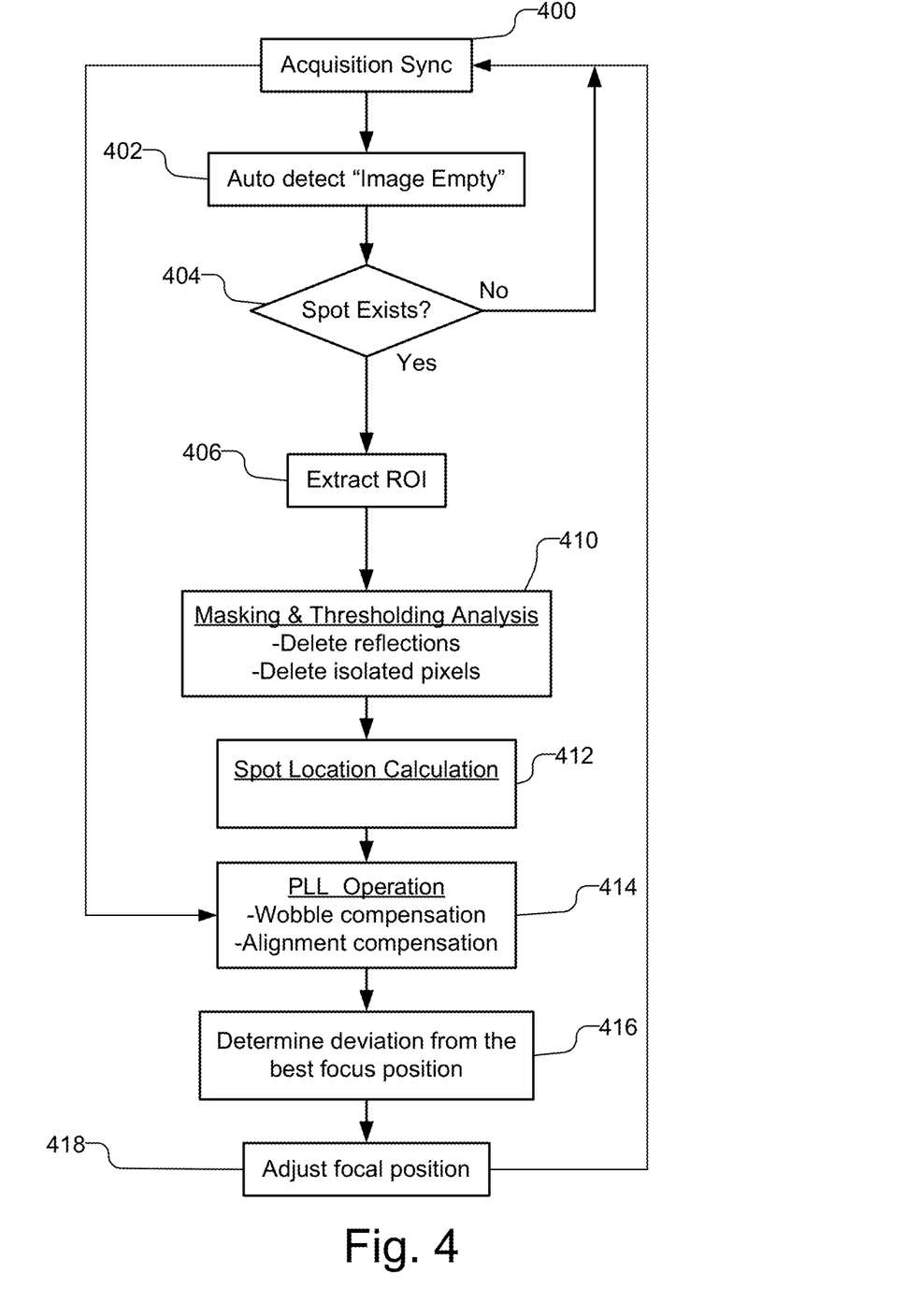
FIG. 4 is a flow chart illustrating processing of the sensor signal provided by a focus system to automatically adjust the focal position of the ellipsometer.

FIG. 4 illustrates a flow chart of the auto focus process, which may be performed completely or in part by detector 156 or frame grabber board 157, e.g., (FPGA and DSP), external to the computer 130. As illustrated, an acquisition synchronization 400 step is performed, in which the controller/driver 105D for the rotating compensator 105 (or polarizer 104) provides a synchronization (trigger) signal to the frame grabber board 157 to be used to compensate for spot movement on the sample, as discussed below. An auto detection of an empty image may be performed (402). An empty image is detected, e.g., by finding a threshold level to separate the spot from the background by auto thresholding, which well known in the art of image processing. If a spot does not exist (404), i.e., there is no region of interest, and the process starts over with acquisition synchronization 400. If a spot does exist (404), the region of interest (ROI) may be extracted from the image (406). If desired, e.g., where the spot size is as large as the sensor 304 or where the processor is sufficiently powerful, such as when an FPGA is used in the frame grabber board 157, a ROI may not be extracted and the whole image may be calculated directly.

Most digital cameras, such as those used in conventional metrology systems include an internal auto exposure control. The auto exposure control of such cameras, however, is inadequate for the present high precision focusing system 150, which uses a single spot on the CCD. Auto exposure control in conventional cameras attempts to adjust the exposure for the whole CCD and thus will lose control when there is single spot on the CCD. Moreover, if the image is downloaded to the computer 130 to perform the exposure control, there would be too much delay, which would lead to unstable control. Thus, the focusing system 150 may use the camera exposure control I/O as a slave to the image processing dedicated processor, e.g., on the detector 156 or frame grabber board 157, so the exposure control is in good correlation to what is needed in the image processing. The exposure is adjusted with respect to only the spot on the CCD and not the entire CCD, which is, e.g., 99% empty. Thus, once the spot is located on the sensor 304 of the detector 156, the exposure error based on the local intensity of the spot is calculated, as opposed to calculating the exposure error over the entire sensor.

Additionally, some samples will scatter unwanted light into the path of the auto focus system 150. The amount and pattern of unwanted light will vary depending on the sample. While the optical system of the ellipsometer 100 may be designed to minimize receiving scattered light, the problem cannot be completely eliminated. If the unwanted or scattered light is not excluded from the spot location calculations of the auto focus system, errors will be produced. Accordingly, the auto focus system 150 is configured to be insensitive to scattered light.

To extract the ROI (406), the image may be summed horizontally (X) and vertically (Y) into vectors and the maximum in both vectors is found in X and Y. Using the maximum in X and Y, the ROI can be located and extracted in the image data. The spot can then be determined from the 2D data of the image in the ROI. Masking and thresholding may be performed (410) to filter noise from the signal. In this step, for example, a histogram showing the number of pixels at a given intensity may be produced. Most of the pixels receive little or no signal, so there will be a large peak near zero intensity. The pixels that are illuminated in the auto focus spot will produce a second peak. However, some pixels outside the auto focus spot may be illuminated due to background or scattered light, which are to be removed. To determine if any given pixel is part of the auto focus spot or part of the background, a technique, such as inter class variation auto threshold algorithm, may be employed. The pixels that are part of the auto focus spot are retained, while pixels that are determined to be outside the auto focus spot, e.g., due to reflections or isolated pixels are eliminated or masked.

The spot location calculation for the pixels inside the mask may then be performed (412). In one embodiment, the spot location may be determined based on the centroid of the spot. Other techniques, however, may be used to calculate the spot location. For example, the average x, y location of the pixels in the spot may be used to determine a location of a center of the spot, or a smoothing function may be used to smooth the points in the spot and the maximum may be used as the location of the center of the spot. Alternatively, the center of the spot may be found using a large scale optimization problem, e.g., by treating the perimeter of the spot as an ellipse and finding the center of the ellipse. Of course, other techniques or variation of the above may be used if desired. By way of example, the location of the spot may be calculated as a centroid based on the gray level values (or, alternatively, the binary values) of pixels that have an intensity that is greater than the threshold. A simple centroid calculation would be to assume that all of the pixels inside of the mask are weighted equally, i.e., binary centroid calculation. However, it has been found that when the spot has a Gaussian distribution, the brighter pixels near the center of the "blob" of remaining pixels have less noise than the dimmer pixels at the edge of the blob. Accordingly, a grey level centroid may be produced using a centroid calculation that is weighted by the pixel intensity (aka grey scale), where brighter pixels have a stronger weighting in the calculation according to their intensity, which improves the focus precision. The use of a binary centroid calculation, however, may be advantageous when the internal structure of the spot is not homogenous and is changing in correlation to the changes on the wafer patterns. The auto focus system should be insensitive to the wafer pattern so in that case a binary centroid calculation may be used.

A phase locked loop (PLL) operation may be used (414) to synchronize with the angular position of the rotating optics, so that wobble in the rotating optics may be compensated. Additionally, the PLL locked on the synchronization signal from the rotating optics may be used to compensate for alignment errors. For example, the center of the sensor 304 might not be perfectly aligned to the motion of the spot on the sensor. Moreover, motion of the spot on the sensor 304 may not be linear, for example, because the motion of the spot on the sensor 304 is the result of angular motion, while the sensor 304 is linear. As discussed above, the controller/driver 105D for the rotating optic (i.e., compensator 105 or polarizer 104) outputs a signal indicating the angular position of the rotating optic, which is acquired during the acquisition synchronization (400) step. Using the angular position signal as a "trigger" signal, a PLL may be used to lock on the trigger signal and compensation for any wobble in the rotating optic or alignment error may be performed using a look up table (LUT) in the FPGA in the detector 156 or frame grabber board 157 (or in computer 130), where the values of the look up table are obtained through a calibration procedure. The system may be calibrated, e.g., using a silicon wafer, where the rotating optic is rotated one or more rotations. At each angular position of the rotating optic, the spot location may be measured for a number of different focal heights, and the average spot location for each focal height at each angular position of the rotating optic, i.e., for every trigger angle, is determined and loaded into the LUT. The LUT may be obtained by stepping through the Z axis and recording the Z height, or the offset from a desired focal position with respect to the measured spot location on the CCD. The spot location may be recorded in terms of pixels in the CCD and the focus errors in microns or stage encoder counts may be output from the LUT. Because the wobble and alignment error are hardware dependent, i.e., a property of the optical components of the ellipsometer, this calibration is not expected to change frequently.

Figure 5:
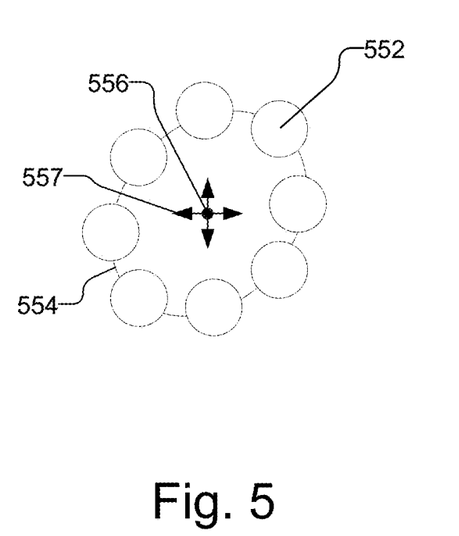
FIG. 5 illustrates the auto focus spot on the sensor with no intensity modulation but with a wobble due to rotating optics.

FIG. 5 illustrates movement of the auto focus spot on the two-dimensional sensor 304 of the detector 156 due to the wobble of the rotating optics. In FIG. 5, the spots 552 represent spots on the two-dimensional sensor 304 of the detector 156 during a sequence of eight exposures as the rotating optic, e.g., rotating compensator 105 or polarizer 104, rotates 360°, e.g., based on PLL trigger signal, even though the focal position of the ellipsometer 100 has not changed. As illustrated, the sequence of exposures may produce an ellipse 554 describing of the movement of the spot 552 as the rotating optic rotates. For the sake of comparison, spot 556 illustrates a center position where the spot 552 would be located if the rotating optic had no misalignment or mechanical wobble, and if the ellipsometer 100 were located at a best focal position. Any movement from the center position, as indicated by arrows 557, provides an indication of the deviation from the best focus position.

The spot location may be calculated for every image frame, e.g., PLL trigger signal, and thus, in practice, there are more than eight exposures for 360° rotation of the rotating optic. As illustrated in FIG. 5, the intensity of the spot 552 in each exposure does not change as the rotating optic rotates, because beam splitter 152 for the focus system 150 is positioned before the analyzer 112. Further, the location of the measurement spot does not vary between different samples due to differences in reflected elliptical polarizations across the spread of incident angles because the focus system 150 is positioned before the analyzer.

The ellipse 554 is a result of the systematic mechanical error, e.g., the wobble of the rotating optic, and may be calibrated away, as discussed above, so that the focus measurements may be performed with single image focal plane data acquisition. For example, the image acquisition from detector 156 may be synchronized with the angular position of the rotating optic. The rotating optic hardware may be designed to send, e.g., 13 trigger signals per 360° rotation of the rotating optic. The use of a PLL, as discussed above, permits division the ellipse 554 into any desired number of angles. During calibration, while the ellipsometer 100 is scanned through different focal positions (Z height), an XY positions of the spot 552 on the sensor 304 may be obtained for each focal position at every desired angular position of the rotating optic and stored in the compensation LUT.

For example, during calibration, the ellipsometer 100 is placed above a blank silicon wafer in that is in focus. The PLL will lock on the triggering signal from the rotating optic signal and produce camera triggers at the predefined acquisition angles. The detector 156 will capture images at every designated angle (triggering from the PLL logic). By way of example, in FIG. 5, eight acquisition angles are shown, but additional (or fewer) acquisition angles may be used, e.g., 13 angles. The XY position of the spot for the focal position at each acquisition angle may be stored in the LUT. The process may be repeated at a different focal heights At run time, the acquisition angle may be determined based on the PLL and the trigger signal from the rotating optic (stage 414 in FIG. 4). The acquisition angles are constant and repeatable and handled by the PLL logic. Because the ellipsometer hardware, i.e., the rotating optic, may have a fixed division of angles, e.g., 13, which may not be equally distributed, the PLL may be synchronized to only the first trigger from the rotating optic in every rotation. The PLL may then generate its own triggers for itself and the detector 156 for the desired division of the acquisition angles.

Referring to FIG. 4, the deviation from a best focus position may then be determined based on the acquisition angle of the rotating optic, the spot imaged at the detector 156, and the calibrated XY position of the spot for the acquisition angle, e.g., stored in the LUT (416). For example, based on the acquisition angle, e.g., determined from the PLL trigger, the focal height may be determined from the LUT based on the measured XY location of the spot on the two-dimensional sensor 304. The LUT table may output the deviation from the best focus position in microns or, e.g., stage encoder counts. The LUT table may alternatively output the current focal position, from which the deviation from the desired best focus positon may be calculated and converted to stage encoder counts.

The focal position of the ellipsometer 100 may then be adjusted accordingly (418), e.g., by sending the results to a servo controller for the actuator 109 to move the stage 108 to eliminate the determined focal position offset.

Due to the configuration of the focus system 150, and in particular the location of the beam splitter 152 before the analyzer 112, the intensity of the spot imaged by the detector 156 does not change as the rotating optic rotates. For example, as illustrated in FIG. 5, the intensity of each spot 552 at different acquisition angles is constant. Accordingly, the deviation from best focal position may be performed with a single shot focal plane data acquisition, i.e., using a single imaged spot 552 from any acquisition angle.

Figure 6:
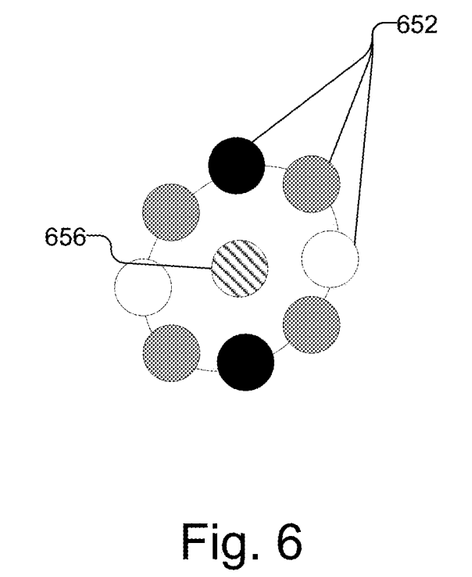
FIG. 6 illustrates an auto focus spot on the sensor with both an intensity modulation and a wobble due to rotating optics.

In contrast, if the analyzer 112 is positioned before the beam splitter 152, the intensity of the spot received by the focus system will be modulated between 0% and 100% due to the rotation of the rotating optic. FIG. 6, by way of example, illustrates imaged spots 652 in a focus system positioned after the analyzer 112, showing movement of the spot due to the wobble of the rotating optic and the variation in intensity due to rotation of the rotating optic. The different gray levels of the spots 652 represent different intensities. As illustrated, the spots 652 cycle through 0% and 100% intensity due to the rotation of the rotating optic. The presence of 0% intensity or near 0% intensity at several locations during the cycle of the rotation of the rotating optic means that the focal position of the ellipsometer 100 cannot be measured at these acquisition angles or a plurality of images must be acquired and integrated over a portion of the rotation period in order to produce an adequate signal from which a center position 656 can be determined and used to measure the focal position offset. This limits the temporal bandwidth to be on the order of half of a complete mechanical cycle of the rotating elements of the ellipsometer. Further, for proper image acquisition a proportional-integral-derivative controller (PID) controller may be necessary to predict the exposure time and/or gain for the detector to create a stable exposure for the spot that follows the sinusoidal changes in the spot intensity. Thus, with such a configuration, a single shot focal plane data acquisition, i.e., using a single imaged spot from any acquisition angle, cannot be used. The configuration of focus system 150, with the beam splitter 152 positioned before the analyzer 112 as illustrated in FIG. 1, results in faster, i.e., real-time, focal position measurements with less processing requirements.

Figure 7:
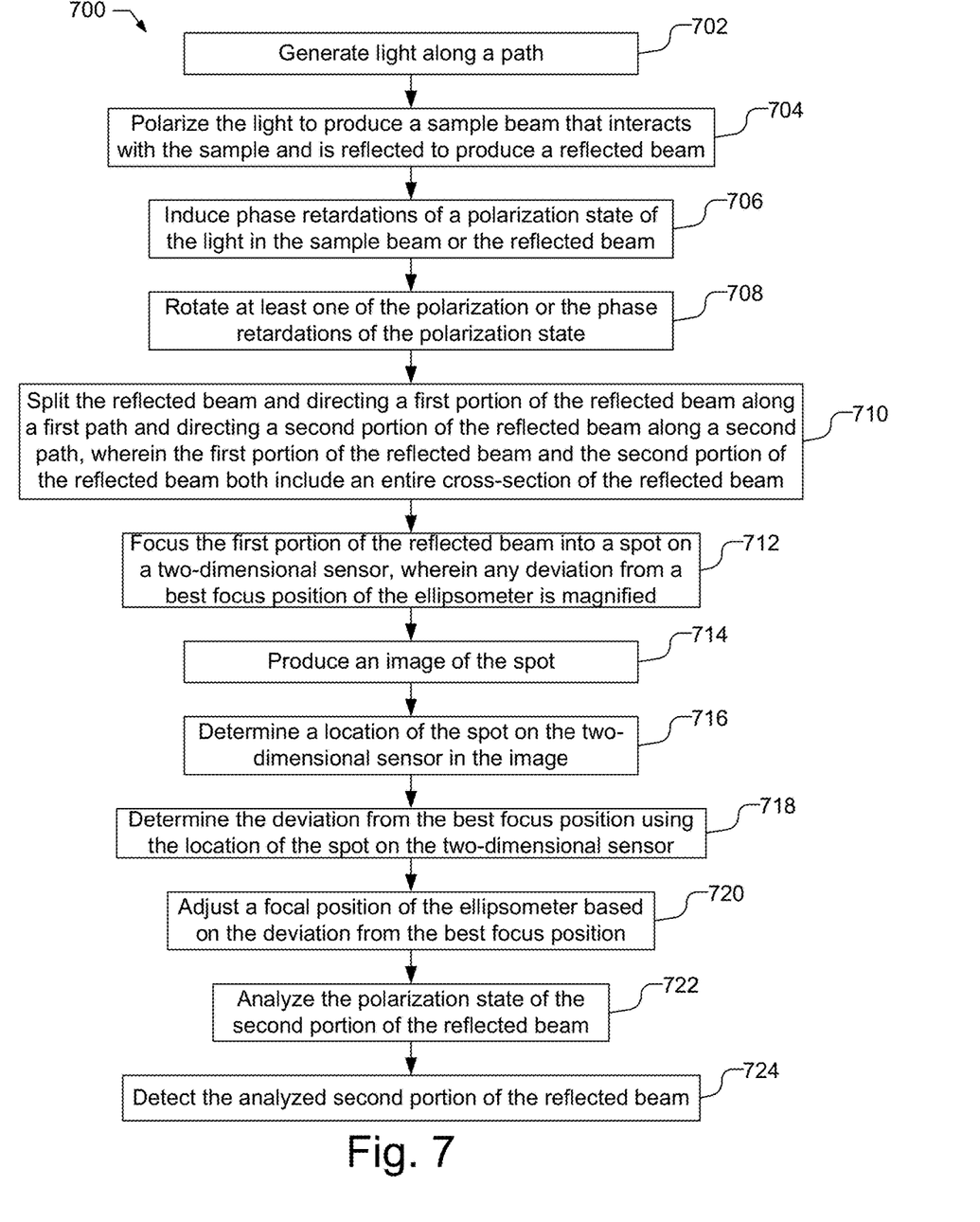
FIG. 7 is a flow chart illustrating a method of focusing an ellipsometer.

FIG. 7 is a flow chart 700 illustrating a method of focusing an ellipsometer, such as ellipsometer 100 shown in FIG. 2, in accordance with one embodiment. As illustrated, at block 702, light is generated along a path, and at block 704, the light is polarized to produce a sample beam that interacts with a sample and is reflected to produce a reflected beam. At block 706, phase retardations of a polarization state of the light in the sample beam or the reflected beam are induced. At block 708, at least one of the polarization or the phase retardations of the polarization state is rotated. At block 710, the reflected beam is split a first portion of the reflected beam is directed along a first path and a second portion of the reflected beam is directed along a second path, wherein the first portion of the reflected beam and the second portion of the reflected beam both include an entire cross-section of the reflected beam. For example, the reflected beam may be split and the first portion of the reflected beam directed along the first path and the second portion of the reflected beam directed along the second path by a pellicle beam splitter. At block 712, the first portion of the reflected beam is focused into a spot on a two-dimensional sensor, wherein any deviation from a best focus position of the ellipsometer is magnified. For example, any deviation from the best focus position of the ellipsometer may be magnified by at least 2×. Moreover, the spot may be 50 percent or smaller than the two-dimensional sensor. At block 714, an image of the spot is produced. At block 716, a location of the spot on the two-dimensional sensor in the image is determined. At block 718, the deviation from the best focus position is determined using the location of the spot on the two-dimensional sensor. For example, to determine the deviation from the best focus position, a single image of the spot on the two-dimensional sensor may be used. At block 720, a focal position of the ellipsometer is adjusted based on the deviation from the best focus position. At block 722, the polarization state of the second portion of the reflected beam is analyzed, e.g., with analyzer 112 shown in FIG. 2. At block 724, the analyzed second portion of the reflected beam is detected.

In one implementation, rotating at least one of the polarization or the phase retardations of the polarization state causes the location of the spot to move on the two-dimensional sensor and the process may further include compensating for movement of the location of the spot on the two-dimensional sensor. For example, the process may include providing an indication of an angular position of the at least one of the polarization or the phase retardations of the polarization state, wherein compensating for the movement of the location of the spot on the two-dimensional sensor may use the indication of the angular position of the at least one of the polarization or the phase retardations of the polarization state.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. An ellipsometer comprising:
a source that emits light along a path to be incident on and reflected by a sample to produce a reflected beam;
a polarization state generator that produces a polarization state of the light that is incident on the sample, the polarization state generator comprising at least a first polarizer;
a beam splitter positioned to receive the reflected beam and to direct a first portion of the reflected beam along a first path toward a first detector for focusing the ellipsometer and to direct a second portion of the reflected beam along a second path toward a polarization state analyzer, wherein the first portion of the reflected beam and the second portion of the reflected beam both include an entire cross-section of the reflected beam;
the first detector is positioned in the first path to receive the first portion of the reflected beam, wherein the first detector comprises a two-dimensional sensor and the first portion of the reflected beam is imaged as a spot on the two-dimensional sensor;
the polarization state analyzer is positioned in the second path to receive the second portion of the reflected beam from the beam splitter, the polarization state analyzer comprising a second polarizer;

a second detector positioned to receive the second portion of the reflected beam from the polarization state analyzer; and a processor coupled to the first detector and is configured to determine a location of the spot on the two-dimensional sensor to determine any deviation from a best focus position of the ellipsometer.

2. The ellipsometer of claim 1, wherein the processor is configured to determine any deviation from the best focus position of the ellipsometer using a single image of the spot on the two-dimensional sensor.

3. The ellipsometer of claim 1, wherein the polarization state generator further comprises a compensator and wherein at least one of the first polarizer and the compensator rotates about an axis parallel to a propagation direction of the light and causes the location of the spot to move on the two-dimensional sensor as the at least one of the first polarizer and the compensator rotates, wherein the processor is configured to compensate for movement of the location of the spot on the two-dimensional sensor.

4. The ellipsometer of claim 3, wherein the processor is coupled to receive an angular position signal indicating an angular position of the at least one of the first polarizer and the compensator, wherein the processor is configured to use the angular position signal to compensate for the movement of the location of the spot on the two-dimensional sensor.

5. The ellipsometer of claim 1, further comprising an actuator for altering a focal position of the ellipsometer, wherein the actuator alters the focal position of the ellipsometer based on a determined deviation from the best focus position.

6. The ellipsometer of claim 1, wherein the beam splitter is a pellicle beam splitter.

7. The ellipsometer of claim 1, further comprising a lens system that receives the first portion of the reflected beam from the beam splitter and directs the first portion of the reflected beam to the first detector, wherein the lens system magnifies any deviation from the best focus position of the ellipsometer by at least 2×.

8. The ellipsometer of claim 7, wherein the spot focused by the lens system on the two-dimensional sensor is 50 percent or smaller than the two-dimensional sensor.

9. A method of operating an ellipsometer, the method comprising:

generating light along a path to be incident on and reflected by a sample to produce a reflected beam;

producing a polarization state of the light that is incident on the sample with a polarization state generator;

splitting the reflected beam and directing a first portion of the reflected beam along a first path toward a first detector for focusing the ellipsometer and directing a second portion of the reflected beam along a second path toward a polarization state analyzer, wherein the first portion of the reflected beam and the second portion of the reflected beam both include an entire cross-section of the reflected beam;

detecting an image of the first portion of the reflected beam with the first detector in the first path as a spot on a two-dimensional sensor;

determining a location of the spot on the two-dimensional sensor in the image;

determining any deviation from a best focus position using the location of the spot on the two-dimensional sensor;

analyzing the polarization state of the second portion of the reflected beam with the polarization state analyzer in the second path; and detecting the second portion of the reflected beam with a second detector after analyzing the polarization state.

10. The method of claim 9, wherein determining any deviation from the best focus position uses a single image of the spot on the two-dimensional sensor.

11. The method of claim 9, further comprising rotating the polarization state with at least one of a rotating polarizer or a rotating compensator in the polarization state generator that causes the location of the spot to move on the two-dimensional sensor, the method further comprising compensating for movement of the location of the spot on the two-dimensional sensor.

12. The method of claim 11, further comprising providing an indication of an angular position of the at least one of the rotating polarizer or the rotating compensator; wherein compensating for the movement of the location of the spot on the two-dimensional sensor uses the indication of the angular position.

13. The method of claim 11, further comprising altering a focal position of the ellipsometer based on a determined deviation from the best focus position.

14. The method of claim 9, wherein splitting the reflected beam and directing the first portion of the reflected beam along the first path and directing the second portion of the reflected beam along the second path is performed by a pellicle beam splitter.

15. The method of claim 9, further comprising focusing the first portion of the reflected beam as the spot on the two-dimensional sensor with a lens system, wherein any deviation from the best focus position of the ellipsometer is magnified by at least 2×.

16. The method of claim 15, wherein the spot is 50 percent or smaller than the two-dimensional sensor.

17. An ellipsometer comprising:

a source that emits light along a path to be incident on and reflected by a sample to produce a reflected beam;

a means for generating a polarization state of the light that is incident on the sample;

a means for splitting the reflected beam after the means for generating the polarization state of the light and to direct a first portion of the reflected beam along a first path toward a first detector for focusing the ellipsometer and to direct a second portion of the reflected beam along a second path toward means for analyzing the polarization state of the reflected beam, wherein the first portion of the reflected beam and the second portion of the reflected beam both include an entire cross-section of the reflected beam;

the first detector is positioned in the first path to receive the first portion of the reflected beam, wherein the first detector comprises a two-dimensional sensor and the first portion of the reflected beam is imaged as a spot on the two-dimensional sensor;

the means for analyzing the polarization state of the reflected beam is positioned in the second path to receive the second portion of the reflected beam from the means for splitting the reflected beam;

a second detector positioned to receive the second portion of the reflected beam from the means for analyzing the polarization state of the reflected beam; and a processor coupled to the first detector and is configured to determine a location of the spot on the two-dimensional sensor to determine any deviation from a best focus position of the ellipsometer.

18. The ellipsometer of claim 17, wherein the processor is configured to determine any deviation from the best focus position of the ellipsometer using a single image of the spot on the two-dimensional sensor.

19. The ellipsometer of claim 17, wherein the means for generating the polarization state of the light rotates about an axis parallel to a propagation direction of the light and causes the location of the spot to move on the two-dimensional sensor as the means for generating the polarization state of the light rotates, wherein the processor is configured to compensate for movement of the location of the spot on the two-dimensional sensor.

20. The ellipsometer of claim 19, wherein the processor is coupled to receive an angular position signal indicating an angular position of the means for generating the polarization state of the light, wherein the processor is configured to use the angular position signal to compensate for the movement of the location of the spot on the two-dimensional sensor.

21. The ellipsometer of claim 17, further comprising an actuator for altering a focal position of the ellipsometer, wherein the actuator alters the focal position of the ellipsometer based on a determined deviation from the best focus position.

22. The ellipsometer of claim 17, further comprising a means for focusing the first portion of the reflected beam as the spot on the two-dimensional sensor, wherein any deviation from the best focus position of the ellipsometer is magnified by at least 2×.

23. The ellipsometer of claim 22, wherein the spot focused by the means for focusing on the two-dimensional sensor is 50 percent or smaller than the two-dimensional sensor.

* * * * *